Oct. 3, 1939.  R. BLAHO  2,174,549
AUTOMOBILE ACCESSORY AND METHOD OF MAKING SAME
Filed Dec. 1, 1936
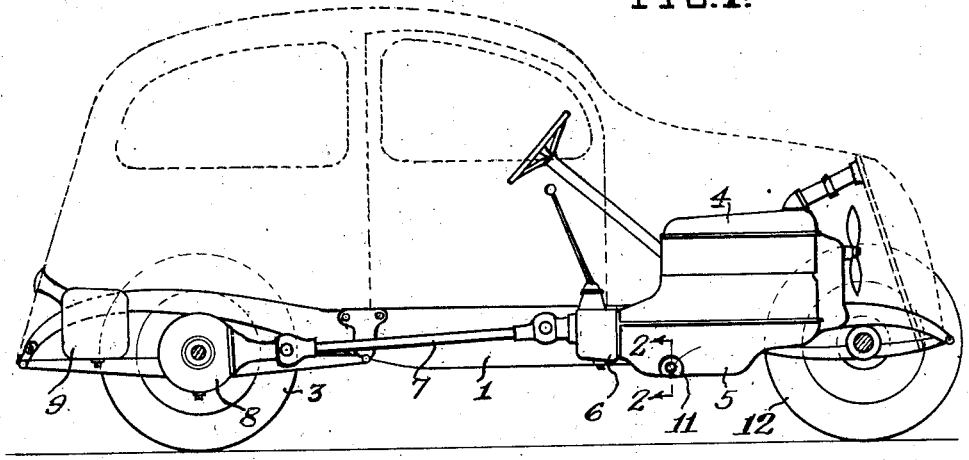
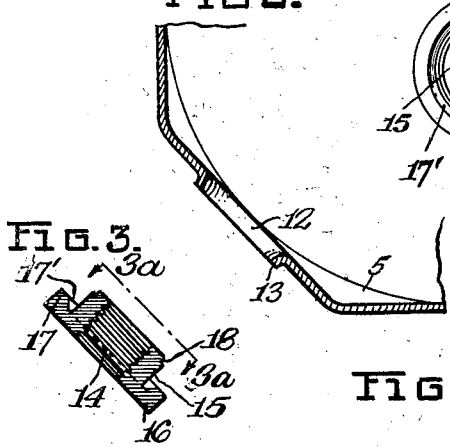
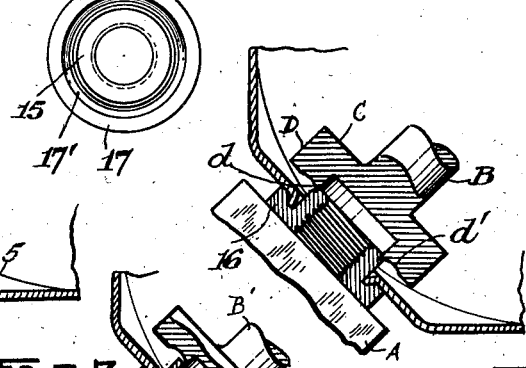
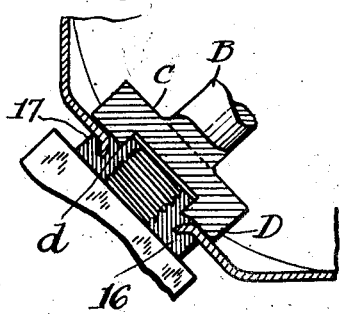
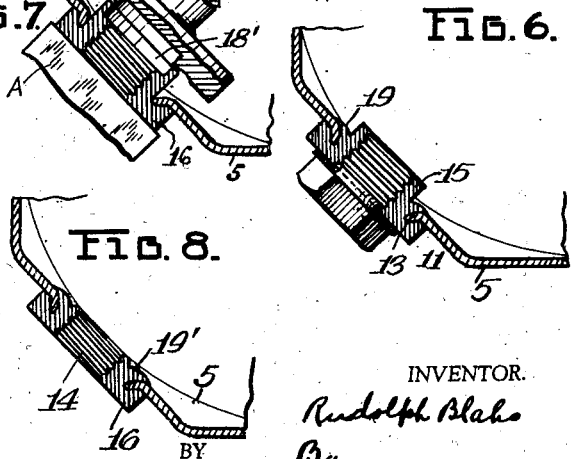
INVENTOR.
Rudolph Blaho
BY Geo. B. Pitts
ATTORNEY.

Patented Oct. 3, 1939

2,174,549

UNITED STATES PATENT OFFICE 2,174,549

AUTOMOBILE ACCESSORY AND METHOD OF MAKING SAME

Rudolph Blaho, Cleveland, Ohio, assignor to Metal Fittings, Inc., Cleveland, Ohio, a corporation of Ohio Application December 1, 1936, Serial No. 113,555

3 Claims. (Cl. 29—148.2)

This invention relates to a fitting adaptable for parts of automobiles. Several automobile parts illustrated herein consist of a crank case, a transmission casing, a rear axle or differential housing and a gasoline tank; but such fitting may be applied for other uses, including junction boxes for electric conduits and heating appliances.

One object of the invention is to provide an improved process for assembling the fitting and its supporting wall and rigidly connecting the fitting and its supporting wall in a liquid tight manner.

Another object of the invention consists of an improved process for securing in rigid position a fitting wherein a portion of the latter is partially sheared and pressed over its supporting wall to interlock the fitting and wall together.

A further object of the invention is to provide an improved mounting for a fitting in the wall of a holder or enclosing casing.

In my improved process and mounting, as will later be apparent, the required upsetting or drawing of the metal of the supporting wall for the fitting is reduced to a minimum, and by means of a single tool operating in one direction a portion of the metal of the fitting is sheared and folded laterally and set in permanent clamping relation with the supporting wall. Furthermore, the threaded portion of the fitting may be made long or short, as various conditions may require. Other advantages and objects of the invention will be apparent to those skilled in the art from the following description taken in connection with the accompanying drawing, wherein:

Fig. 1 is a side view of an automobile chassis showing certain parts or accessories and mechanisms for the automobile, including the engine crank case, transmission casing, rear axle or differential housing and gasoline tank, each having a fitting embodying my invention and assembled according to my process; parts being broken away and the automobile body being shown diagrammatically by dotted lines.

Fig. 2 is a fragmentary section showing one step of the process.

Fig. 3 is a sectional view of the fitting constructed according to another step of my process.

Fig. 3a is a plan view of the fitting, taken on the line 3a—3a of Fig. 3.

Fig. 4 is a fragmentary section showing another step of the process and the tool and anvil in position to effect the succeeding steps of the process.

Fig. 5 is a view similar to Fig. 4 but showing the tool in final position completing the final step of the process.

Fig. 6 is a fragmentary sectional view of the assembled parts, showing a sealing member threaded into the fitting, being a section on the line 6—6 of Fig. 1.

Fig. 7 is a view similar to Fig. 4, but showing a modified construction of the fitting.

Fig. 8 is a sectional view showing the fitting of the construction shown in Fig. 7 in assembled position.

In the drawing, 1 indicates as an entirety a chassis frame mounted on front and rear pairs of wheels, 2, 3 (only one wheel of each pair being shown). 4 indicates an engine, the walls of which are connected to a crank case 5. The engine is drivingly connected through a suitable transmission mechanism within a casing 6 to a shaft 7, the latter in turn operating through a differential mechanism in a housing 8 to drive the wheels 3. 9 indicates a gasolene tank, the connection thereof with the engine and other mechanisms, parts and driving and control means being omitted from the drawing as not being necessary to a disclosure of the present invention. Each of the parts or accessories above referred to is provided with a sealing member 10 and a fitting 11, the latter being assembled with the wall of the part according to the following steps; first, I form in the wall of the part an opening 12 the annular wall of which is drawn to form a substantially conical rim 13, as shown in Fig. 2. Next, a section of relatively soft steel is bored through and tapped to form an internally threaded wall 14 and its outer portion shaped to form a body portion 15 having at one end an outwardly extending flange 16. Also, the flange 16 is provided on its inner face with a collar 17 forming around the inner end of the body portion 15 an annular pocket 17' the outer side wall of the pocket 17' being inclined outwardly substantially complementary to the rim 13. As shown, the bottom wall of the pocket 17' is parallel to the outer face of the flange 16, its inner side wall is at right angles to the bottom wall and its outer side wall is inclined outwardly; and the radial width of the bottom wall is substantially equal to the thickness of the rim 13. Also, the outer end of the body portion 15 is formed with an annular recess 18, the side wall of the recess defining substantially the area along and surrounding an imaginary cylinder concentric to the axis of the body portion 15, that is to be sheared, as later set forth. In the form of construction shown in Figs. 3, 3a and 4, the annular recess, shown at 18, is formed exteriorly of the body portion; whereas in Fig. 7 the recess, shown at 18', is formed interiorly of the body portion for a purpose later set forth. Next, the fitting and its supporting wall are associated as shown in Fig. 4, that is, the flange 16 is seated against one face of the supporting wall with the rim 13 projecting into the annular pocket 17' and the body portion 15 extends through the opening 12 beyond the opposite face of the wall. When thus associated, the fitting is mounted on a base or anvil A of a suitable press the reciprocating member of which carries an annular tool B capable of carrying out in coacting relation to the base A, the remaining steps of the process, namely, shearing the outer circumferential portion of the body portion along the imaginary cylinder already referred to, folding the sheared portion, under pressure, against the rim 13, as shown at 19, to effect a clamped relation of the rim 13 with the outer end of the collar 17 and compressing the metal contiguous to and between the body portion and folded portion in an axial direction to effect both axial and lateral pressure to clamp the rim 13 against the outer side wall of the pocket 17'. In this arrangement, the rim 13 is compressed between a surface having angularly related walls in cross section and a surface of curvilinear shape in cross section, the effect of which is to secure the fitting in position, locked against rotative and axial movement. The tool B is provided with a head C terminating in an annular wall D, the inner edge of which is provided with a shearing edge $d$ surrounded by a concave groove $d'$ which forms a die to engage and clamp the sheared portion into final position, as above set forth.

Where it is desired to prevent the inner end of the device from extending beyond the inner face of the wall in which it is mounted to any substantial extent, as for example, to insure complete draining from the part, the annular recess at the outer end of the body portion is formed interiorly thereof, as shown at 18' in Fig. 7, and the bottom wall of the recess (which forms the end wall of the threaded portion) terminates substantially in the plane of the inner face of the part. In this form of construction, I provide on the outer end of the body portion a relatively thin, circumferential wall which is curled outwardly by the groove $d'$ of the tool in advance of the shearing edge $d$ so that the latter in advancing to the end of its movement has but a small amount of metal to shear, as shown at 19'. By providing an annular curling groove $d'$ in contiguous relation to the shearing edge $d$, danger of the tool in its active stroke forcing any of the metal of the body portion 15 inwardly and affecting the diameter of the bore 14 or distortion of the threads therein, is eliminated. It will be noted that the portion of the metal sheared from the body portion is relatively thin in cross section so that a large press and an undue amount of power is not required to effect the shearing and clamping steps.

It will be noted that the fitting may be bored and/or tapped after it is secured in position but by preference, these operations are carried out prior to the positioning of the fitting.

To those skilled in the art to which my invention relates, many changes in construction and widely differing modifications and applications of the invention will be apparent without departing from the spirit and scope of the invention. My disclosures and the description herein are purely illustrative and are not intended to be in any sense limiting.

What I claim is:

1. An automobile accessory comprising a holder one wall of which is formed with an opening surrounded by a lateral rim and a plug receiving device having a flange engaging one face of said wall and a hollow, annular body portion extending through said opening, said flange being formed at the inner end of said body portion with an annular pocket into which said rim seats and the metal of the outer surface of the body portion outwardly of said flange being sheared on an imaginary cylinder and pressed downwardly and laterally against said rim to secure the latter in said pocket.

2. The herein disclosed process of securing a plug receiving device on the wall of a holder which consists in forming an opening in the wall of the holder and drawing laterally the marginal portion of the wall around the opening to form a rim, then inserting in said opening a device having a hollow, annular body portion extending through said opening and a flange at one end formed with an annular pocket at the inner end of said body portion, with the flange engaging one face of said wall and said rim seated in said pocket, and then in shearing the metal of the body portion along and outwardly of an imaginary cylinder extending from the outer end thereof inwardly and curling the sheared portion over and folding it under pressure against said rim to secure it in said pocket.

3. The herein disclosed process of securing a plug receiving device on the wall of a holder which consists in forming an opening in the wall of the holder with a laterally projecting circumferential rim, then inserting in said opening a device having a hollow, annular body portion extending through said opening and formed at its outer end with an annular recess and having a flange at one end formed with an annular pocket at the inner end of said body portion, with the flange engaging one face of said wall and said rim seated in said pocket, and then in shearing the metal of the body portion along and outwardly of an imaginary cylinder substantially coincident with the vertical wall of said recess and extending from the outer end of said body portion inwardly and curling the sheared portion over and folding it under pressure against said rim to secure it in said pocket.

RUDOLPH BLAHO.